April 14, 1931.    J. W. KOPKE ET AL    1,800,638
OUTBOARD MOTOR
Filed Feb. 9, 1928    5 Sheets-Sheet 1

INVENTOR
James W. Kopke and Harold M. Foddy
BY Clarence G. Galston
ATTORNEY

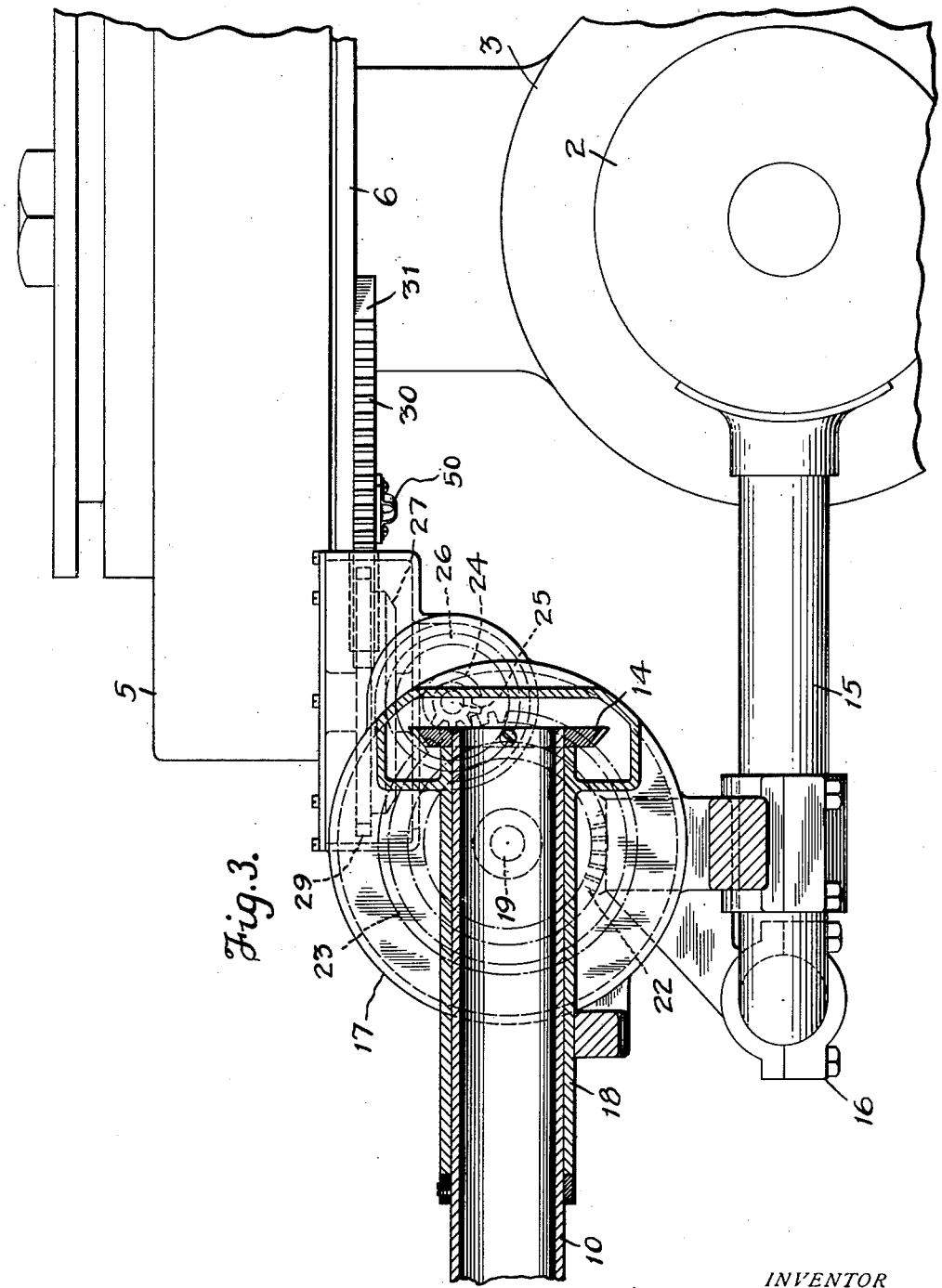

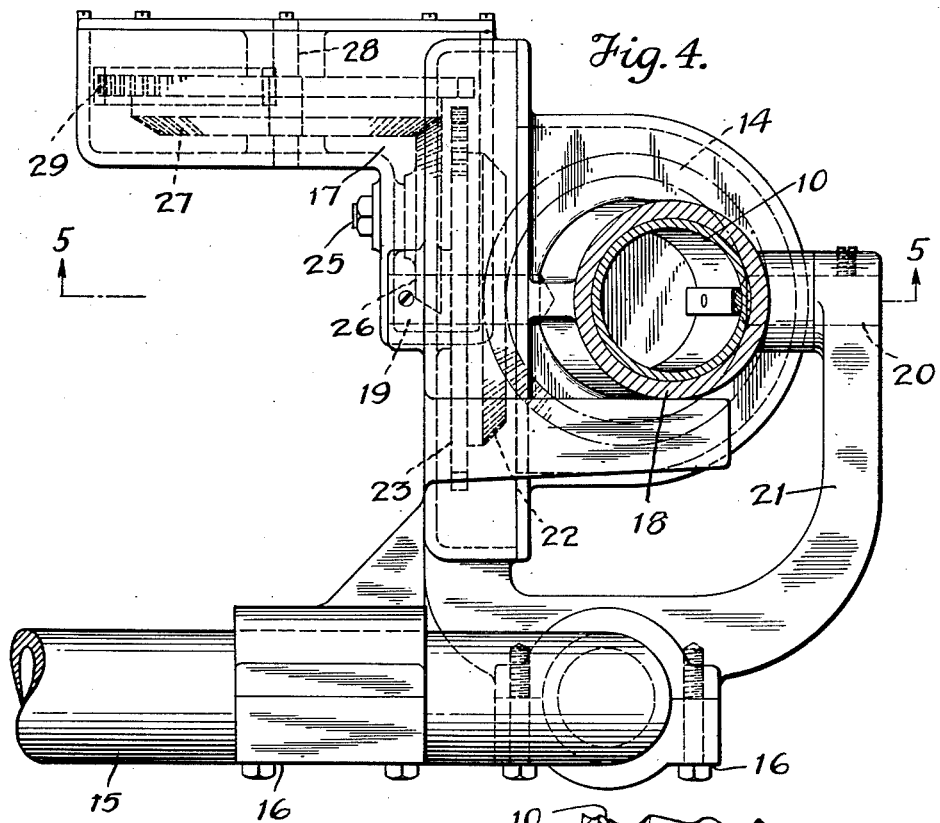
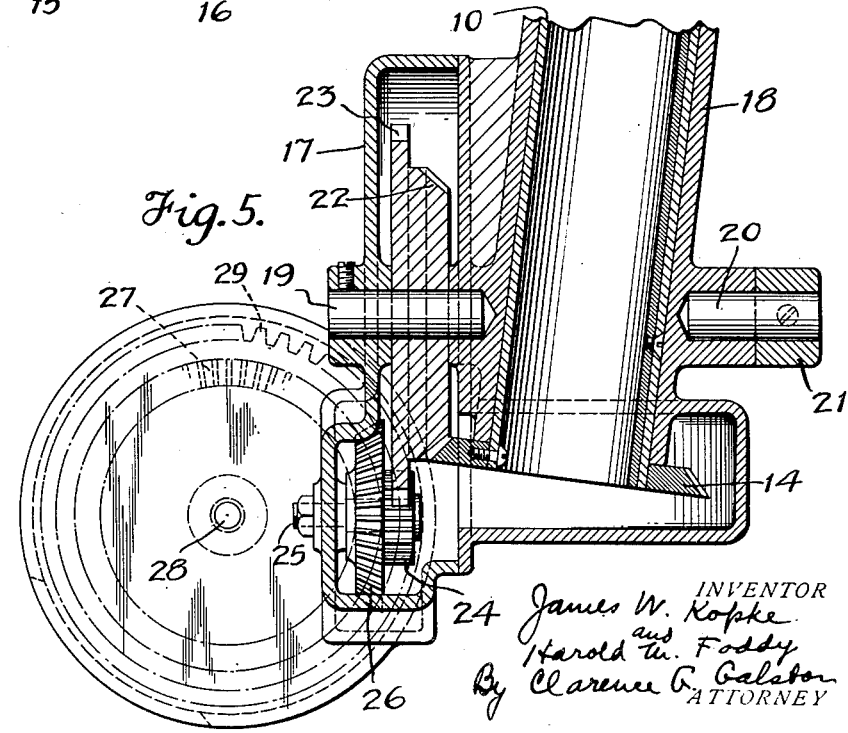

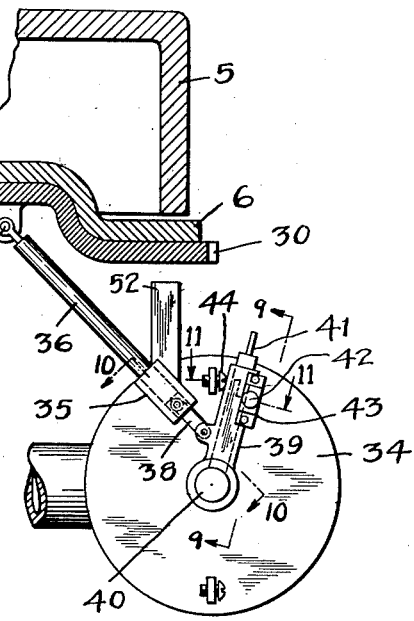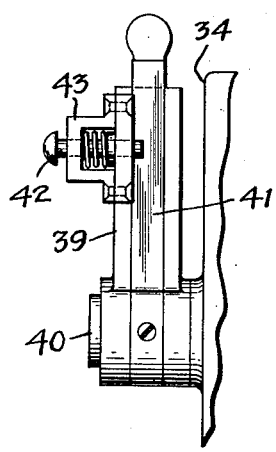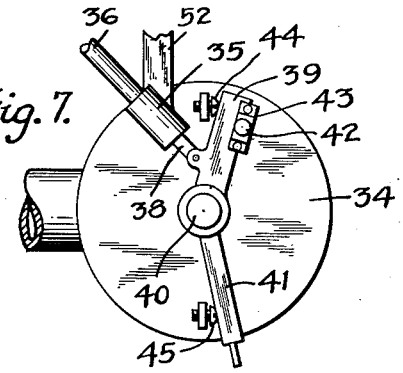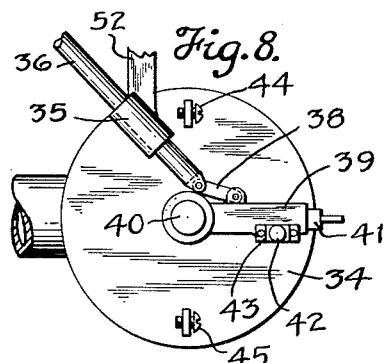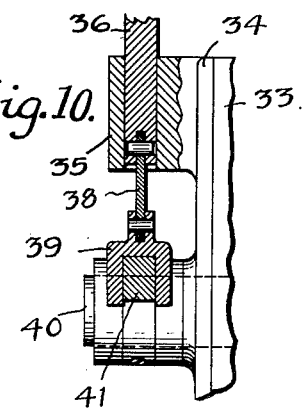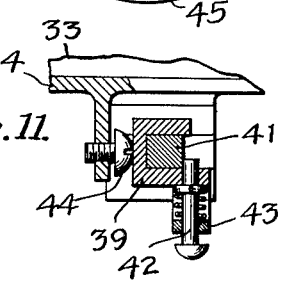

April 14, 1931. J. W. KOPKE ET AL 1,800,638
OUTBOARD MOTOR
Filed Feb. 9, 1928 5 Sheets-Sheet 5
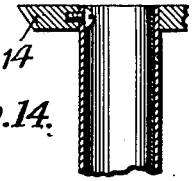
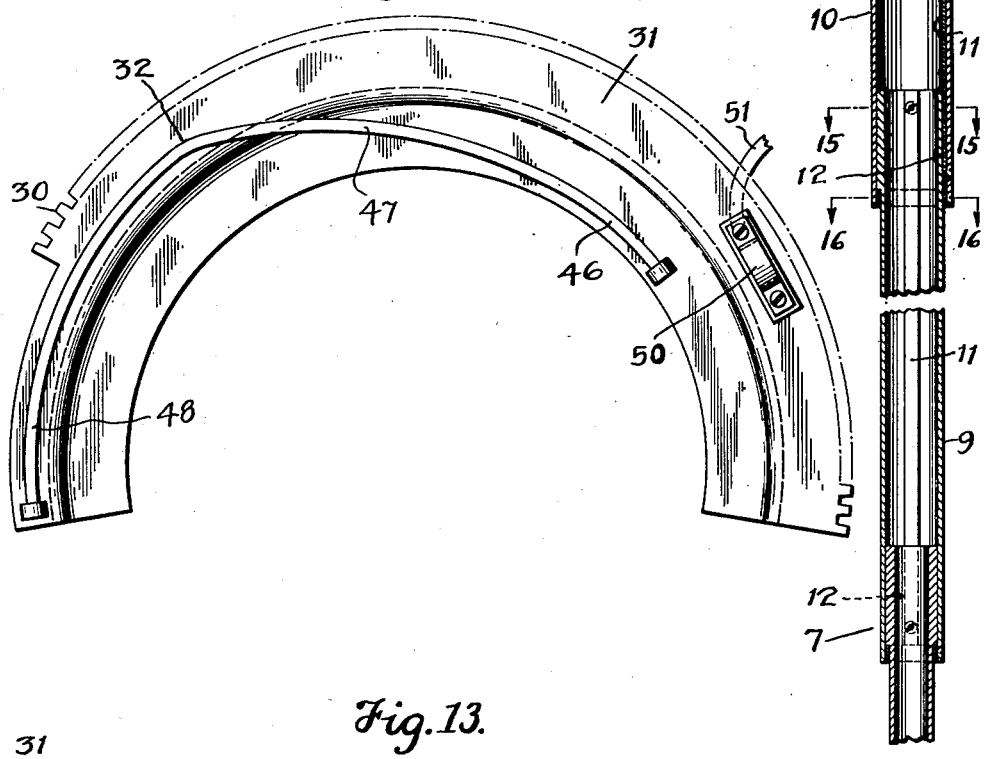
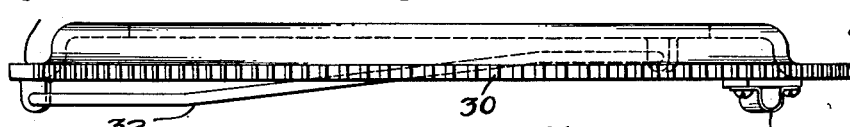
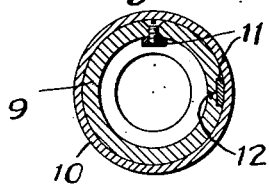
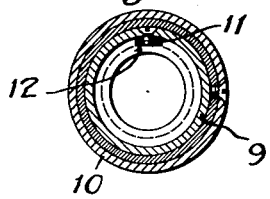
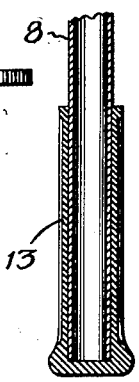

Patented Apr. 14, 1931

1,800,638

UNITED STATES PATENT OFFICE

JAMES W. KOPKE AND HAROLD M. FODDY, OF BROOKLYN, NEW YORK

OUTBOARD MOTOR

Application filed February 9, 1928. Serial No. 252,969.

The invention relates to improvements in outboard motors for small craft, and is particularly directed to a means for retarding or advancing the spark and controlling the supply of fuel coordinately, by manipulating a long tiller handle formed of a plurality of members which may be telescoped one within the other.

Light weight speed boats of a type using an outboard or detachable motor are in common use and are quite popular at the present time. They have a very serious drawback owing to the fact that the weight of the motor and the weight of the person operating the motor being in the stern of the boat, the bow of the boat will be caused to rise a considerable distance out of the water. Due to this condition it is impossible to utilize the maximum power of the motor without danger of upsetting. This can be overcome to some extent by substituting a long rigid handle for the ordinary short tiller. However, when starting the boat it is essential for the operator to remain close to the motor as he must advance the spark and regulate the carburetor until the boat reaches the desired speed. The advancing of the spark and the feed of the fuel are separate operations and the controls are on different parts of the motor. At this time the boat will be caused to lie at such an angle that it is nearly impossible for the operator to see where he is going. As a speed of twenty miles per hour and upwards is very often attained by boats of this description, it may readily be seen that a considerable risk is always incurred while the motor is being brought up to its desired speed.

The principal object of this invention is to overcome this fault. In accordance with the invention the operator starts the motor with the spark retarded and the carburetor admitting just sufficient gas to the cylinders to cause the motor to run. The operator then extends the handle or tiller and moves near the center of the boat so as to put it on an even keel. Then, by rotating the grip on the handle he automatically advances the spark and feeds the fuel until the maximum or desired speed is reached. In this way the operator always has complete control of the boat, both as to steering and speed, from an advantageous position either at or near the center of the boat. The tiller is also movable in a vertical plane so that the operator may change its position whenever he desires for ease in driving or any other purpose. When collapsed the handle or tiller may be swung over the motor where it occupies a small space and does not interfere with the canvas protection covering that is placed over the motor when it is not in use.

Other objects and advantages of the invention will become apparent as this specification proceeds.

Referring to the accompanying drawings which are to be taken as part of this specification and in which is illustrated merely a preferred form or embodiment of the invention:

Fig. 3 is a side elevation with parts in the plane of the handle or tiller in section and parts of the motor broken away for lack of space;

Fig. 4 is a front elevation of the parts shown in Fig. 2, with the handle or tiller in section;

Fig. 5 is a sectional plan view, taken on the line 5—5 of Fig. 4;

Fig. 6 is a fragmentary detail view partly in section of the throttle end of the carburetor and operating connection between the throttle and the guide on the timer disc. In this view the parts are shown in the position they would assume with the gas substantially shut off;

Fig. 7 is a view similar to Fig. 6, but with the timer disc, its associated parts and the fly-wheel not shown. In this view the parts are illustrated in the position they would assume when the motor is being started or in the choke position;

Fig. 8 is a view similar to Figs. 6 and 7 with the parts in the position they would assume when the gas is fully turned on under normal running conditions;

Figure 1:
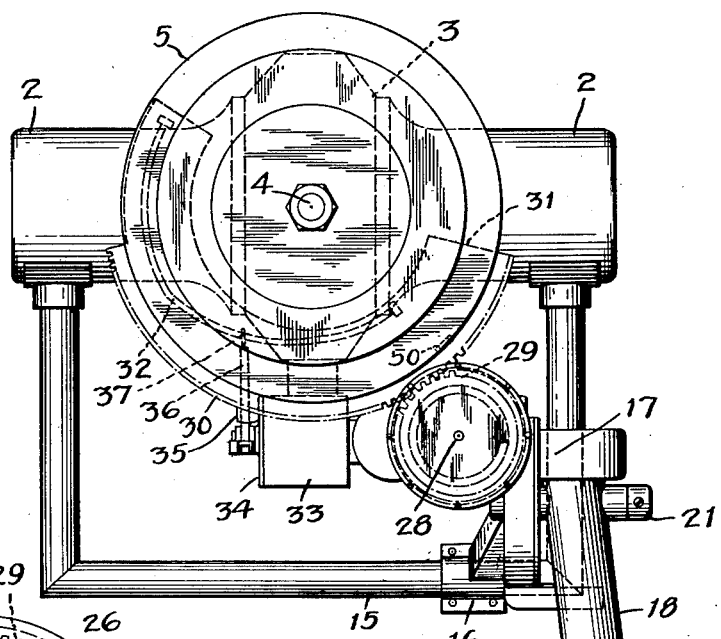
Fig. 1 is a top plan view.
Figure 2:
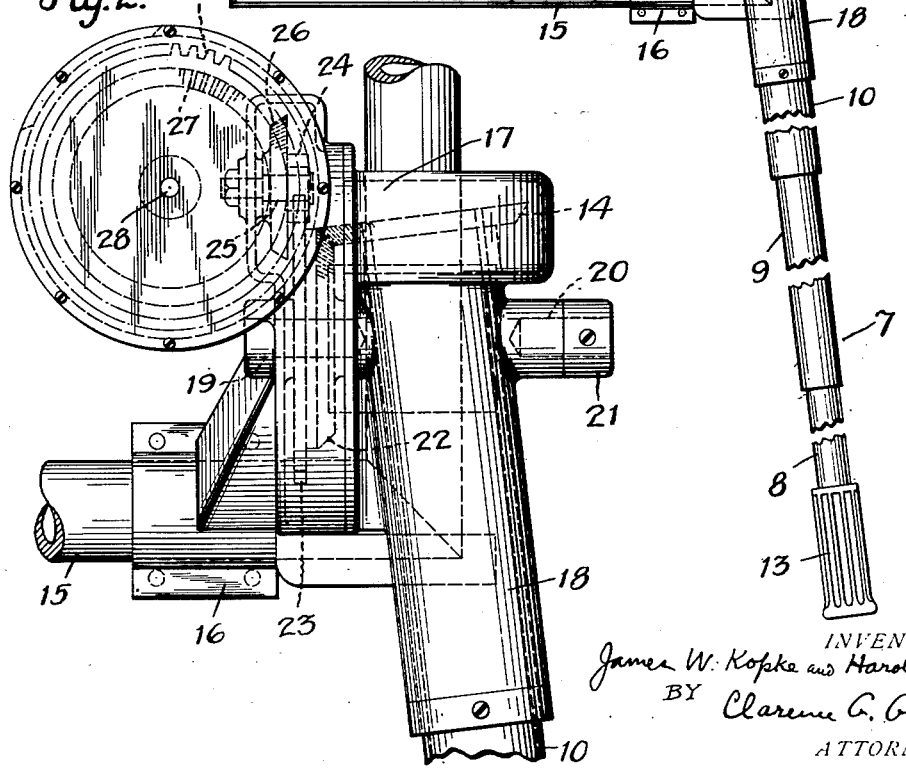
Fig. 2 is a plan view on an enlarged scale showing the inner end of the collapsible handle or tiller and the train of gears by means of which axial movement of the tiller is transferred to the quadrant on the timer disc.

Fig. 9 is a detail fragmentary elevation of main and auxiliary levers of the throttle;

Figs. 10 and 11 are fragmentary detail sectional views taken on the lines 10—10 and 11—11, respectively, of Fig. 6;

Fig. 12 is a bottom plan view of the plate secured to the timer disc;

Fig. 13 is a side view of said plate;

Fig. 14 is a longitudinal section, with parts broken out, of the operating handle or tiller; and Figs. 15 and 16 are detail cross-sectional views taken on the lines 15—15 and 16—16 of Fig. 14.

Referring again to said drawings, the reference characters 2—2 designate the cylinders of the outboard motor, which, as illustrated, are on opposite sides of the crank case 3. Supported above the crank case 3 and on the main driving shaft 4 is the conventional fly wheel 5. For clearness and simplicity of illustration many parts of the outboard motor, such as the fuel tank, cooling pipes, the propeller and its framework, manifolds, the clamp for securing the motor to the back of the boat and other things, are omitted. These parts and others are all well known in this art and it is therefore not thought necessary to illustrate them. Situated under the fly-wheel 5 is the conventional timer disc or plate 6. Mounted on this disc 6 and in the fly-wheel is a well known form of magneto. The timer disc 6 ordinarily has a handle attached to it for manually moving said disc to advance or retard the spark. In the present invention this disc is moved automatically by means that will hereinafter be described. The timer disc handle is not illustrated in the drawings, but if desired could be placed on the disc in addition to the automatic means for moving it.

As heretofore mentioned, the motor is ordinarily provided with a short tiller or steering handle. In accordance with the present invention this handle 7 is adjustable as to length and is preferably formed of a plurality of sections 8, 9 and 10. These sections telescope one within the other and are provided with keys 11 and key-ways 12, so that they may slide relatively to each other but are prevented from rotary movement in relation to each other. The outer section 8 of the handle has a hand grip 13 and the inner section 10, or the section nearest the motor, has a bevel gear 14 secured to its end, adjacent the motor. When extended, the handle or tiller is of sufficient length so that the operator may sit in about the central part of a small boat and steer the boat from that location. When the handle is collapsed it will be about the length of the ordinary short handle and as will be later explained it may be swung upward in a vertical plane, and when swung upward and over the motor it will take up very little room in its collapsed position.

The motor illustrated is of that type in which a horizontally disposed U-shaped yoke 15 extends from the forward side thereof. Secured to this yoke in a suitable manner at 16 is a housing 17 for a train of gears which convey motion from the bevel gear 14 on the end of the tiller to the timer disc 6.

The inner section 10 of the handle or tiller is mounted in a bearing 18 which is pivoted on trunnions 19 and 20 secured in the housing 17 and a bracket 21 which may be formed as part of the housing. The bevel gear 14 meshes with another bevel gear 22 which is mounted on the trunnion 19. From the foregoing and an inspection of the drawings it may be readily observed that the handle or tiller may be pivoted on the trunnions 19 and 20 and thus move in a vertical plane. When being moved in a vertical plane, the bevel gear 14 will roll around on the bevel gear 22, but will always be in mesh with it so that regardless of the position of the tiller any axial movement thereof will cause the bevel gear 22 to rotate on its axis.

Secured to or formed integral with the bevel gear 22 is a spur gear 23. This spur gear 23 engages a pinion 24 mounted on a stud 25 secured in the housing 17. The pinion 24 is secured to or formed integral with another bevel gear 26 which meshes a bevel gear 27 mounted on a vertical stud 28 which is also mounted in the housing 17. The bevel gear 27 is also part of a compound gear, the other part being a spur gear 29 which engages the quadrant 30 on the timer disc 6. It will be plain from the foregoing that any movement of the tiller about its axis 8 will result in movement of the timer disc. The gear ratio is preferably such that one-half a revolution of the handle 7 will cause the spur gear 29 to move the quadrant its full length of travel.

Numerous changes in gear ratio and the number and arrangement of the gears might readily be made to accomplish the desired result. Different conditions will be encountered on different types of motors, but the parts are susceptible of being readily rearranged so that the essentials will not be departed from.

The teeth of the quadrant 30 are preferably formed on the periphery of a plate 31 which is secured in any suitable manner to the timer disc 6. The plate 31 also carries a guide bar 32 which has an operating connection to the throttle control of the carburetor. The teeth 30 of the quadrant might readily be cut on the outer edge of the timer disc 6 and the guide rod 32 secured to the under side of said disc. However, the construction illustrated lends itself with greater ease to installation on existing motors.

The numeral 33 designates the carburetor. Attached to the mixing chamber thereof is a plate 34 which has a bearing 35 formed thereon or attached thereto. A rod 36 is slidably mounted in the bearing 35 and its upper end is provided with an eye 37 which embraces the guide bar 32. Pivoted to the lower end of the slide rod 36 is a link 38, the opposite end of which is pivoted to an auxiliary gas control lever 39. This auxiliary gas control lever is freely mounted on the carburetor shaft 40 and embraces the main gas control lever 41 which is pinned or otherwise secured to the carburetor shaft 40. During normal operation the auxiliary gas control lever 39 is secured to the main gas control lever 41 by means of a spring-pressed pin 42, which is mounted in a yoke 43 secured to the auxiliary gas control lever. Adjustable stops 44 and 45 are provided to limit the movement of the gas control levers.

It will be noted that part of the guide bar 32 follows the circumference of the timer disc 6 and is concentric with the center of the timer disc and part of said bar is eccentric to the center of the timer disc. When the motor is first started the spark is in its retard position and the eye 37 would be engaging the part 46 of the guide rod 32. By the time the spark has been about half way advanced from the retard position the eye 37 will have passed over the eccentric part 47 of the guide bar 32. This will have caused the main and auxiliary gas control levers to have passed from the position of Fig. 6 to that shown in Fig. 8, and in the position of Fig. 8 the carburetor will be feeding the maximum amount of fuel used under normal running conditions. A continued advance of the spark will increase the speed of the engine and during this continued advance the eye 37 will be passing over the concentric part 48 of the guide bar 32, until the fully advanced position of the spark is reached and the motor has attained its maximum speed. In this way the retarding or advancing of the spark and the feed of the fuel are coordinated and always under conjoint control by axial turning movement of the tiller.

Under normal conditions when the parts are in the position illustrated in Fig. 6 just sufficient fuel is being fed to cause the motor to idle and, as just stated, when the parts are in the position shown in Fig. 8 the maximum amount of gas is being fed for normal running condition. However, in starting the motor, particularly when it is cold it is essential to choke the carburetor. It is for this reason that the auxiliary gas control lever 39 is provided. In starting the motor the pin 42 would be raised and the main gas control lever disengaged from the auxiliary lever and pulled down to the position shown in Fig. 7. After the motor has warmed up the lever 41 would be pushed back into engagement with the auxiliary gas control lever 39 and the operation would thereafter be controlled by the tiller.

Means are provided so that the motor may be stopped when desired. A spring contact 50 is secured to the plate 31 and insulated therefrom and is connected to the magneto by wire 51. A projection 52 on the carburetor engages the contact 50 when the timer disc has reached or passed the position of complete retard and establishes a ground circuit so as to ground the magneto and stop the motor.

The parts as illustrated are particularly adapted to be placed on existing motors with a minimum amount of work. If the device were being built into the original motor many changes in detail might be advantageously made. One type of outboard motor is illustrated and described. Slight changes in fittings and arrangement of parts would readily permit it to be applied to other styles.

What is claimed as new is:

1. A device of the character described having in combination, a steering handle capable of being turned about its axis and formed of a plurality of members capable of being telescoped one within the other, a gear on the end of said handle adjacent the motor, and means for employing the motion imparted to this gear to control the throttle and spark.

2. A device of the character described having in combination, a handle capable of being turned about its axis and formed of a plurality of members capable of being telescoped one within the other, a gear on the end of said handle adjacent the motor, and a set of gears engaged by said gear for transmitting the motion from said gear to the throttle and sparking device so that the feed of the fuel and the advancing or retarding of the spark are controlled by turning said handle about its axis.

3. A device of the character described having in combination, a handle formed of a plurality of members capable of being telescoped one within the other, a gear on the end of said handle adjacent the motor, a train of gears engaged by said gear, a quadrant mounted on the timer disc, said quadrant being engaged by said train of gears, and a connection between said timer disc and the throttle, the arrangement being such that rotation of said handle on its axis will control the advancing or retarding of the spark and the supply of fuel.

4. A device of the character described having in combination, a handle formed of a plurality of members capable of being telescoped one within the other, a gear on the end of said handle adjacent the motor, a train of gears engaged by said gear, a quadrant mounted on the timer disc, said quadrant being engaged by said train of gears, a guide mounted on said timer disc, and members cooperating with said guide and connected to the throttle, the arrangement being such that rotation of said handle on its axis will control the advancing or retarding of the spark and the supply of fuel.

5. A device of the character described having in combination, a tiller capable of being turned about its axis, a gear on the end of said tiller adjacent the motor, and means for employing the motion imparted to this gear to control the throttle and spark.

6. A device of the character described having in combination a tiller capable of being turned about its axis, a gear on the end of said tiller adjacent the motor, a set of gears engaged by said gear for transmitting motion from said gear to the throttle and sparking device so that the feed of the fuel and the advancing or retarding of the spark are controlled by turning said tiller about its axis.

7. A device of the character described having in combination a tiller capable of being turned about its axis, a gear on the end of said tiller adjacent the motor, a train of gears engaged by said gear, a quadrant mounted on the timer disc, said quadrant being engaged by said train of gears, and a connection between said timer disc and the throttle, the arrangement being such that rotation of said handle on its axis will control the advancing or retarding of the spark and the supply of fuel.

JAMES W. KOPKE.
HAROLD M. FODDY.